Nov. 20, 1962 — F. KUCHTA ET AL — 3,064,351
GRASS CUTTING SHEARS
Filed Jan. 15, 1962
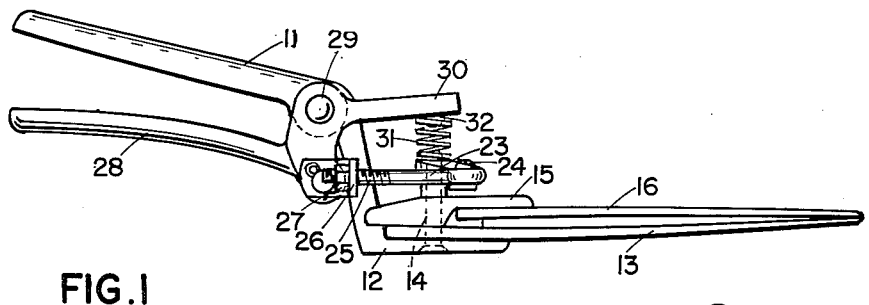
FIG. 1
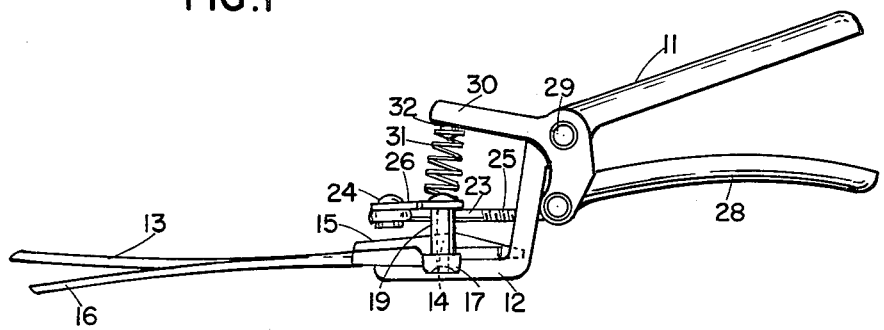
FIG. 2
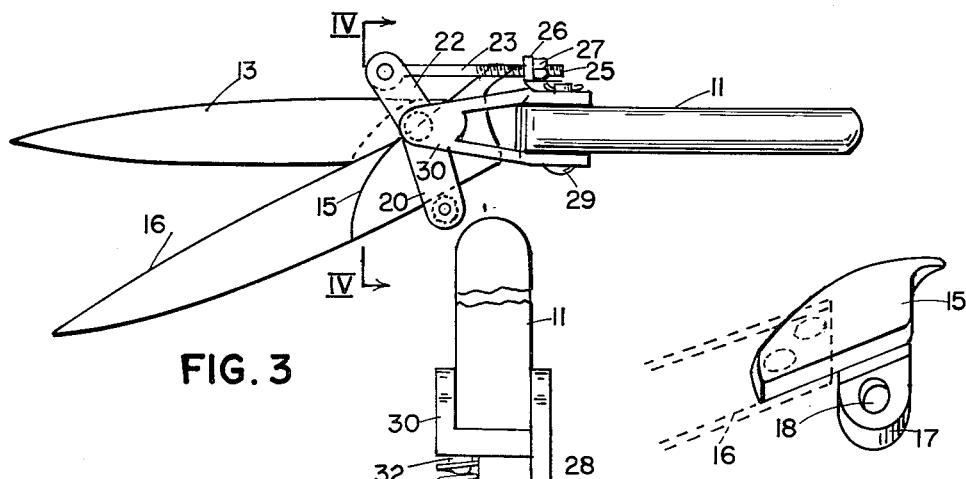
FIG. 3
FIG. 5
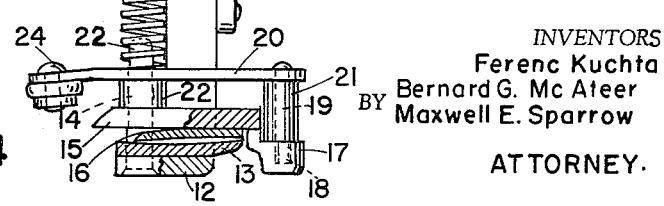
FIG. 4
INVENTORS
Ferenc Kuchta
Bernard G. Mc Ateer
Maxwell E. Sparrow
BY
ATTORNEY.

3,064,351
GRASS CUTTING SHEARS
Ferenc Kuchta, Maplewood, and Bernard G. McAteer, Rockaway, N.J., assignors to J. Wiss & Sons Co., Newark, N.J., a corporation of New Jersey
Filed Jan. 15, 1962, Ser. No. 166,127
2 Claims. (Cl. 30—248)

This invention relates to hand-operated shears or garden clipping tools, and more particularly to improvements of such hand-operated grass cutting shears.

In conventionally known tools, of this kind, such as described in the pending U.S. patent application Serial No. 819,162, there is a rigid, stationary handle to which the stationary cutting blade is attached. Pivotally mounted on this handle is a movable, lever-like handle, which is connected by a linkage to a movable blade which is pivotally mounted atop of said stationary blade, so that a shearing or cutting effect is attained when said movable handle is operated.

This invention consists in the novel parts, construction arrangements, combinations and improvements herein shown and described.

The general object of this invention is to provide for an improvement of the mounting of the movable blade.

A further object of this invention is to provide for a straight, simple, moveable shearing blade, which can be easily manufactured, hardened, ground and assembled with the other pertinent parts.

Yet another object is to provide for an apparatus which can be produced in an economical manner, composed of uncomplicated parts.

Still another object of the invention is to provide for an improvement of such shears, by which the movable blade is yieldingly pressed down with its cutting edge against the cutting edge of the stationary blade in such manner that the shearing or cutting pressure increases in proportion to the force which is exerted on the movable handle and which is increased naturally when a tougher object between the shearing edges of the blades increases the resistance to the shearing action.

Various further and more specific objects, features and advantages will clearly appear from the detailed description given below taken in connection with the accompanying drawings which form part of this specification and illustrate merely by way of example one embodiment of the device of the invention.

In the following description and in the claims, parts will be identified by specific names for convenience, but such names are intended to be as generic in their application to similar parts as the art will permit. Like reference characters denote like parts in the several figures of the drawings.

FIG. 1 is a side elevation of the right side of the shears, in closed position;

FIG. 2 is a side elevation of the left side of the shears, in open position.

FIG. 3 is a top view of the shears in open position;

FIG. 4 is a cross section along the line 4—4 of FIG. 3, seen in the direction of the arrows;

FIG. 5 is a perspective view of the ride to which the moveable blade is attached (dotted lines).

Referring now more in detail to the drawings illustrating a preferred embodiment by which the invention may be realized, there is shown in FIGS. 1 and 2 the shears from the right side and from the left side, respectively. A stationary, rigid handle 11 supports on its lower portion 12 a stationary cutting blade 13, which is riveted or in any other suitable manner attached to said lower portion 12. A vertical stud 14 is riveted into said lower portion 12. This stud 14 serves as a pivotal point for a special plate 15 which also is called a "ride" in the trade. This ride 15 is the supporting member for the straight, movable cutting blade 16, which is riveted to said ride 15. The ride 15 has a downwardly extending lug 17 on its left side. A hole 18 in this lug 17 is engaged by a loosely fitted pin 19 which is riveted into a horizontal cross bar 20 which is pivotally arranged on said same stud 14 in such manner that it may swing back and forth about said stud, moving the ride 15 and blade 16 with it for a shearing or cutting engagement with the stationary blade 13. A spacer 21 keeps the cross bar 20 in a proper distance from the top surface of the ride 15. The cross bar 20 has an extended arm 22 to which a link 23 is connected by means of a pin 24. The link 23 has a threaded end 25 which is held in a small bracket 26 by thread and secured with a nut 27. The bracket 26 is pivotally mounted on the side of an operating handle 28 which in turn can be swingably operated about a horizontal shaft 29 which in turn is located in the rigid stationary handle 11.

The operating handle 28 also has an arm 30 which protrudes horizontally in a forward direction, said arm 30 holding compressibly a spring 31 which is located about a protruding pin 32 so that said spring may not snap out. The other end of said spring 31 abuts against the center area of the horizontal cross bar 20, and the main pivotal stud 14 is extending beyond the top face of the cross bar 20 for engaging and holding said other end of the spring 31.

The operation is simple. When the operating handle 28 is pulled against the stationary handle 11, the link 23 pulls one arm of the horizontal cross bar 20 and swings by means of pin 19, engaging lug 17 of the ride 15, the movable blade 16 against the stationary blade 13. However, since the lug 17 extends downwardly below the level of the cutting edge of the movable blade 16 attached to the ride 15, and since the other arm of the cross bar 20 is above the engaging point of the lug 17, a cocking action of the movable blade 16 occurs, particularly when there is a heavier resistance between the shearing blades and obviously a stronger force being exerted on the handle in order to overcome this resistance. In proportion to the movement of the handle 28, spring 31 is increasingly compressed and provides at the same time the elastic means for the return stroke.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

We claim:
1. Shears which have a stationary handle, a stationary cutting blade rigidly connected at one end of said handle, a movable blade having a cutting edge in shearing engagement with said stationary cuttting blade, an operating handle having a forwardly extending arm, said operating handle being pivotally mounted intermediate its ends on said stationary handle,
   said shears comprising in combination
      a vertically arranged stud on said one end of said stationary handle,
      a ride pivotally mounted on said stud, said ride having said movable cutting blade attached thereto,
      a lug on said ride, said lug extending downwardly below the level of said cutting edge of said movable blade,
      a double-arm cross bar pivotally mounted on said stud on top of said ride, said cross bar comprising means for loosely engaging said lug of said ride, linkage means connecting one arm of said cross bar with said operating handle, and a compression spring interposed between said double-arm cross bar and said forwardly extending arm of said operating handle for urging said movable cutting blade attached to said ride yieldingly against said stationary cutting blade, said extending arm having a pin for holding said spring in place.

2. Shears which have a stationary handle, a stationary cutting blade rigidly connected at one end of said handle, a movable blade having a cutting edge in shearing engagement with said stationary cutting blade, an operating handle having a forwardly extending arm, said operating handle being pivotally mounted intermediate its ends on said stationary handle, said shears comprising in combination a vertical stud on said one end of said stationary handle, a ride pivotally mounted on said stud, said ride having said movable cutting blade attached thereto, means including a lug on said ride, said lug extending downwardly below the level of said cutting edge of said movable blade, for operatively connecting said operating handle with said lug for obtaining a rocking motion of said ride and a compression spring interposed between said means and said forwardly extending arm of said operating handle for yieldingly urging said cutting edge of said movable blade on said ride against said stationary cutting blade, said extending arm having a pin for holding said spring in place.

No references cited.